US008241577B2

(12) United States Patent
Georis et al.

(10) Patent No.: US 8,241,577 B2
(45) Date of Patent: Aug. 14, 2012

(54) SYSTEM FOR STORING AN ADDITIVE AND INJECTING IT INTO THE EXHAUST GASES OF AN ENGINE

(75) Inventors: Philippe Lucien Valmy Georis, Chelles (FR); Nadja Walling, Janville (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 519 days.

(21) Appl. No.: 12/513,780

(22) PCT Filed: Nov. 14, 2007

(86) PCT No.: PCT/EP2007/062304
§ 371 (c)(1),
(2), (4) Date: May 6, 2009

(87) PCT Pub. No.: WO2008/058977
PCT Pub. Date: May 22, 2008

(65) Prior Publication Data
US 2009/0311147 A1 Dec. 17, 2009

(30) Foreign Application Priority Data

Nov. 16, 2006 (FR) ..................................... 06 10039
Jun. 28, 2007 (FR) ..................................... 07 56106

(51) Int. Cl.
*F01N 3/20* (2006.01)
*F01N 3/36* (2006.01)
(52) U.S. Cl. ....... 422/173; 60/286; 222/129; 222/145.1; 222/146.5; 222/318; 137/265; 137/563
(58) Field of Classification Search ............... 60/286; 137/265, 563; 222/129, 145.1, 146.5, 318
See application file for complete search history.

(56) References Cited

U.S. PATENT DOCUMENTS

| 2,582,802 | A | * | 1/1952 | Terrell, Jr. .................. 137/563 |
| 2,884,964 | A | * | 5/1959 | Tye ................................ 141/128 |
| 2,914,946 | A | * | 12/1959 | Pope et al. ....................... 73/219 |
| 3,570,717 | A | * | 3/1971 | Olson ................................ 222/52 |
| 4,069,841 | A | * | 1/1978 | Bartlett .................... 137/565.34 |
| 4,883,086 | A | * | 11/1989 | Lejnar ........................... 137/399 |
| 5,020,566 | A | * | 6/1991 | Shoop ............................. 137/265 |

(Continued)

FOREIGN PATENT DOCUMENTS

| DE | 19908955 A1 | 9/2000 |
| EP | 1199097 A1 | 4/2002 |
| FR | 2905161 A1 | 2/2008 |
| WO | WO03090908 A1 | 11/2003 |

(Continued)

*Primary Examiner* — Kenneth Bomberg
*Assistant Examiner* — Brandon Lee
(74) *Attorney, Agent, or Firm* — Oblon, Spivak, McClelland, Maier & Neustadt, L.L.P.

(57) ABSTRACT

Process for storing an additive and injecting it into the exhaust gases of an engine and comprising two tanks for storing the additive and one pump for supplying the additive from these tanks to an injection line, these two tanks being in parallel and each being connected to the pump by a branch of the supply line, each of these branches being equipped with a non-return valve and these two valves being calibrated so that the valve located in the branch coming from the first tank (1) is normally open but closes when this tank is empty, and so that the valve located in the branch coming from the other tank (2) is normally closed but opens when the valve from tank (1) is closed or when the branch coming from this tank (1) is blocked.

10 Claims, 2 Drawing Sheets

U.S. PATENT DOCUMENTS

| | | | |
|---|---|---|---|
| 5,480,063 A * | 1/1996 | Keyes et al. | 222/64 |
| 5,884,475 A | 3/1999 | Hofmann et al. | |
| 2001/0035215 A1 * | 11/2001 | Tipton et al. | 137/571 |
| 2002/0081239 A1 | 6/2002 | Palesch et al. | |
| 2003/0033799 A1 * | 2/2003 | Scheying | 60/286 |

FOREIGN PATENT DOCUMENTS

| | | |
|---|---|---|
| WO | WO2006064001 A1 | 6/2006 |
| WO | WO2008006840 A1 | 1/2008 |
| WO | WO2008023021 A1 | 2/2008 |

* cited by examiner

SYSTEM FOR STORING AN ADDITIVE AND INJECTING IT INTO THE EXHAUST GASES OF AN ENGINE

CROSS-REFERENCE TO RELATED APPLICATIONS

This application is a U.S. national stage application under 35 U.S.C. §371 of International Application No. PCT/EP2007/062304 filed Nov. 14, 2007, which claims priority to French Application No. 0610039 filed Nov. 16, 2006 and to French Application No. 0756106 filed Jun. 28, 2007, these applications being incorporated herein by reference in their entirety for all purposes.

The present invention relates to a system for storing an additive and injecting it into the exhaust gases of an engine With the Euro IV standard on exhaust emissions from heavy goods vehicles coming into effect in 2005, devices for pollution control of $NO_x$ (or nitrogen oxides) have had to be put in place.

The system used by most heavy goods vehicle manufacturers for reducing $NO_x$ emissions to the required value generally consists in carrying out a selective catalytic reaction with reducing agents such as urea ("Urea SCR" or selective catalytic reduction using ammonia generated in situ in the exhaust gases by decomposition of urea).

In order to do this, it is necessary to equip the vehicles with a tank containing a urea solution and also a device for metering the amount of urea to be injected into the exhaust line. Given that the aqueous urea solution generally used for this purpose (eutectic solution with 32.5 wt % urea) freezes at −11° C., it is necessary to provide a heating device to liquefy the solution in order to be able to inject it into the exhaust line in the event of starting in freezing conditions.

Several systems have been provided in the prior art for this purpose. Generally, these systems comprise heating devices that involve either specific and quite expensive heating elements or a bypass of the engine cooling circuit or of the fuel return line present in certain engines (diesel engines, especially with common rail direct injection) for reheating the additive. Application WO 2006/064001 in the name of the Applicant describes a device of the latter type.

For the purpose of increasing the autonomy of the vehicles to a maximum, and considering the encumbrance/architecture of the vehicles, it is sometimes desired to have at least two tanks for storing the urea solution. For the purpose of preventing problems of freezing but avoiding overburdening the cost of the system, it would be desirable to only have to heat one of the two tanks.

Urea systems with two tanks have already been proposed. Thus, U.S. Pat. No. 5,884,475 describes the use of two urea tanks in series: a main (storage) tank and a secondary (low volume) tank which is heated and which is used for starting in case of freezing. No specific device for the transfer of the solution from the main tank to the secondary tank is described in this document, the main urea feed pump playing this role by sucking through the secondary tank. However, when the secondary tank is not located below the main tank, it is not necessarily always full of solution, hence there is a risk of the pump running empty (which could damage it) and of the system not being supplied with additive.

One obvious solution to solve this problem would be to provide an additional pump between the two tanks. However, such a solution is expensive.

DETAILED DESCRIPTION OF EMBODIMENTS

Figure 1:
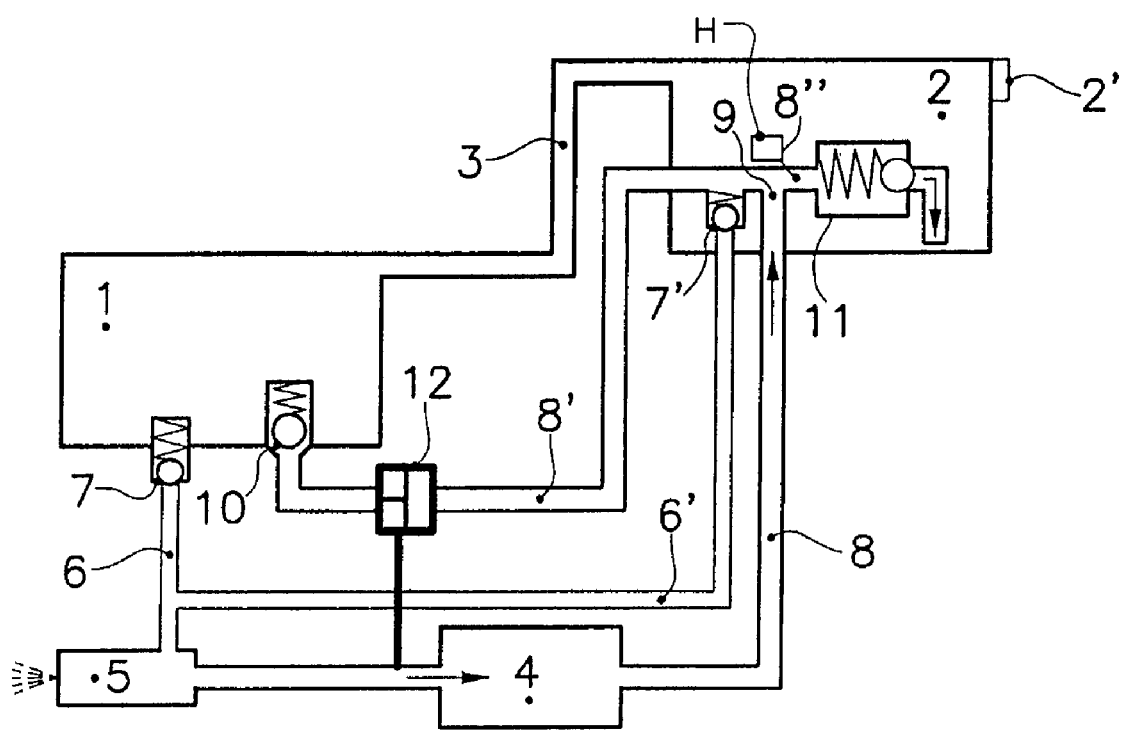
FIG. 1 is a schematic diagram illustrating a system according to an embodiment of the present application.

The present invention aims at solving this problem by providing a urea system that uses two tanks of any capacity (preferably high capacity in order to increase the autonomy of the vehicle) and that are positioned in any manner with respect to one another, said system nevertheless enabling the problem of actual freezing to be solved by only heating one of these tanks and by not using a transfer pump between the two tanks. This system also makes it possible, effectively and with inexpensive means, to drain 2 tanks with a single pump without risk of running empty.

For this purpose, the present invention relates to a system for storing an additive and injecting it into the exhaust gases of an engine and comprising two tanks for storing the solution and one pump for supplying the solution from these tanks to an injection line, these two tanks being in parallel and each being connected to the pump by a branch of the supply line, each of these branches being equipped with a non-return valve and these two valves being calibrated so that the valve located in the branch coming from the first tank (1) is normally open but closes when this tank is empty, and so that the valve located in the branch coming from the other tank (2) is normally closed but opens when the valve from the tank (1) is closed or when the branch coming from this tank (1) is blocked.

Such a system makes it possible to ensure that solution is removed by default from tank (1) and is only removed from tank (2) when tank (1) is no longer functioning (for example, because it is empty or frozen). Hence, it makes it possible to effectively drain the 2 tanks with a single pump. Moreover, with such a structure, it is sufficient to equip tank (2) with a heating device in order to have an effective system in case of freezing.

The additive concerned by the invention is preferably a reducing agent capable of reducing the $NO_x$ present in the exhaust gases of internal combustion engines. It is advantageously an ammonia precursor in aqueous solution. The invention gives good results with aqueous solutions of urea and in particular, eutectic solutions of urea such as solutions of AdBlue® of which the urea content is between 31.8% and 33.2% by weight and which contain around 18% of ammonia. The invention may also be applied to urea/ammonium formate mixtures in aqueous solution, sold under the trademark Denoxium® and which contain around 13% of ammonia. The latter have the advantage, with respect to urea, of only freezing from −35° C. onwards (as opposed to −11° C.), but have the disadvantages of corrosion problems linked to the release of formic acid.

The present invention may be applied to any internal combustion engine, preferably to those comprising a fuel return line, i.e. a line returning the surplus fuel not consumed by the engine to the fuel tank. It is advantageously applied to diesel engines, and in particular to the diesel engines of heavy goods vehicles.

The system according to the invention comprises at least two tanks intended for storing the additive and at least one injection line intended for injecting the additive into the exhaust gases of the engine. According to one preferred variant intended for systems capable of dealing with freezing conditions, tank (2) is equipped with a heating device. The structure of the system according to the invention makes it possible to do without a heating device on tank (1), and hence to save money. The heating device may be of any type. Preferably, it is connected to a thermal regulation device to as to keep the temperature of the additive within a predefined range. A system such as described in the aforementioned Application WO 2006/064001 in the name of the Applicant (and comprising a fuel return section that is able to be bypassed) is particularly suitable for this purpose. Alternatively, a heating filament integrated into a connection enabling the branch of the supply line to be connected to tank (2) (as described in Application FR 06.07531 in the name of the Applicant) is also particularly suitable. Preferably, tank (2) has a lower volume than tank (1) for thermal reasons or for gauging accuracy.

The additive storage tanks may be located anywhere in the vehicle, depending on the space available. However, according to one advantageous variant, tank (2) is at a higher level than that of tank (1) and it comprises an opening or a fill pipe and also an overflow line that opens into tank (1) and is of suitable location and geometry so that tank (1) can be filled by overflowing from tank (2). Such a variant makes it possible to simplify the filling by reducing it to a single operation.

The system according to the invention uses two non-return valves: one in each branch. The valve located in the branch of tank (1) is advantageously a float valve which opens its corresponding branch as long as there is additive in tank (1), and closes it when tank (1) is empty. This float is advantageously spring-loaded for the purpose of ensuring good sealing.

The system according to the invention also comprises a pump that enables the additive to be brought from the tanks to the injection line and that, in order to do this, is connected to these tanks by a supply line. According to the invention, this supply line comprises two branches, each of them connecting the pump to one of the tanks. These two branches may open into a section of common line connecting them to the pump. Alternatively, these two branches may tap directly into the pump. The variant according to which the two branches are connected to the pump by a common section is preferred as it allows savings to be made in terms of lengths of piping.

In this variant, the common section preferably has a length and a location that prevent the additive from freezing in case of subzero temperatures. Alternatively or additionally, this section may be equipped with a heating device (H), schematically illustrated. For example, it is possible to provide a heating filament or a bypass of the fuel return line or of the engine coolant, which surrounds or is close to the section. For the same reason, the branch of the supply line that opens into tank (2) is preferably at least partially located inside said tank.

In one variant which is preferred, the junction between the branches and the common section is made by a substantially "T"-shaped connection preferably located at least partially inside tank (2). Most particularly preferably, this connection is located completely inside tank (2) so as to also be able to be heated in case of freezing.

The system according to the invention is generally also equipped with an injector enabling the additive to be injected into the exhaust gases. This injector may be of any known type. It may be what is called an "active" injector, i.e. one that includes a metering function, or what is called a "passive" injector then coupled to an additional metering device, such as a metering valve for example. It is advantageously a passive injector, and in particular a nozzle or spray gun making it possible to obtain drops of solution having a diameter between 5 and 100 µm. Such a nozzle is advantageously equipped with an orifice having a diameter of around 150 µm-250 µm. This orifice is preferably supplied by a system of narrow channels (3-4) producing a "swirl" (vortex) phenomenon in the solution upstream of the nozzle. Clogging could be avoided by the purge which removes the last droplets of urea; there is therefore no crystallization by evaporation. In this embodiment of the invention, the amount of solution is preferably metered by regulating the opening frequency and duration of the metering valve. This valve may be a piezoelectric or solenoid valve, the regulation of which may be electronic.

Usually, the system according to the invention comprises a control unit connected to the injector and allowing the required amount of additive to be injected into the exhaust gases (the amount being dependent in particular on the following parameters: emission level and degree of conversion of the $NO_x$; temperature and pressure; engine speed and load, etc. and, optionally, the quality (state of ageing) of the solution).

In certain cases, the entire additive flow provided by the pump is not injected into the exhaust gases and the uninjected part must then be recirculated. Such an excess flow may be used to cool certain types of "active" injectors (such as that described in U.S. Pat. No. 5,976,475 for example). It may also be necessary for accurate metering control as it is the case in the system described in Application FR 06/06425 in the name of the Applicant and which involves the use of a metering valve and a pressure regulator.

In a first variant, the amount of unconsumed additive, the case being, is not injected into tank (2), especially when this is not equipped with an overflow line to tank (1). And even when it is equipped therewith, there is a risk that this line could be frozen while tank (1) is not yet frozen (due to its greater thermal inertia), and hence a risk of overfilling and cracking of tank (2) and/or of said line. To overcome this risk, said line can be provided with a heating device, but this is expensive. Hence, this amount is preferably injected into tank (1), into its branch to the pump and/or into the common section between the two branches, when there is one.

In the variant involving a "T" connection described previously, the additive return may be injected at said "T", the latter possibly being heated, especially when tank (2) is heated.

In the case of a return to tank (1) or to its branch, which is nevertheless desirable due to the structure of the system according to the invention, problems may arise if these components are frozen. Hence, two return lines may be provided: one used by default (when it is not freezing) and going towards tank (1) or towards its branch, and the other used in case of obstruction of the first one (in case of freezing) and going towards the "T" or towards the common section. The latter is advantageously equipped with a valve that is normally closed, but which opens when the first line is blocked (in case of freezing).

In the case described previously where the excess additive is used to cool an injector, it is of course hot. Hence, to avoid the risks of overheating at the pump (especially when the additive is injected at the "T" or the common section), it is advantageous to cool the return line or lines, for example by conduction (by ensuring that the path taken by this return is sufficiently long, for example by providing them with at least one coil-shaped part, optionally submerged in the tank or tanks).

Finally, a last subvariant of the system according to the invention aims to ensure that tank (2) can be filled from tank (1) when tank (2) is empty and when tank (1) is still filled with liquid (which may occur in case of prolonged freezing). This problem is solved be providing a three-way valve in the supply branch coming from tank (1) connected to the downstream side of the pump by an additional line. This enables the transfer to be carried out by rotating the pump in the opposite direction.

However, in this subvariant, it is preferable to ensure that tank (1) actually contains liquid and not a solid (frozen liquid) to prevent the pump running empty. This subvariant therefore only works if the liquid contained in tank (1) has been able to defrost since the last use of the system (for example when the system is onboard a vehicle which has been garaged between two uses). To ensure that the content of tank (1) is indeed liquid, several options are possible, for example:

- a temperature sensor may be placed in tank (1) which will prohibit reversal of the rotational direction of the pump if the temperature is too low; or
- it is possible to use a signal from a gauge placed in tank (1) or tank (2) and which will switch off the pump in the case where, in a given time interval, no change of the level in the tank is detected.

A second variant of the system according to the invention makes it possible to solve this problem more effectively by ensuring that, as soon as the system is started, liquid is transferred from tank (1) to tank (2) so that the situations in which tank (1) is full while tank (2) is empty are limited or even nonexistent. In this variant, the pump intentionally discharges an excess flow of additive which supplies the tank (2) with liquid originating from the tank (1) using a bypass line. The latter is preferably equipped with a pressure regulator or a device that makes it possible to provide a calibrated leakage rate so that the injector is always correctly supplied in terms of flow rate and pressure.

Figure 2:
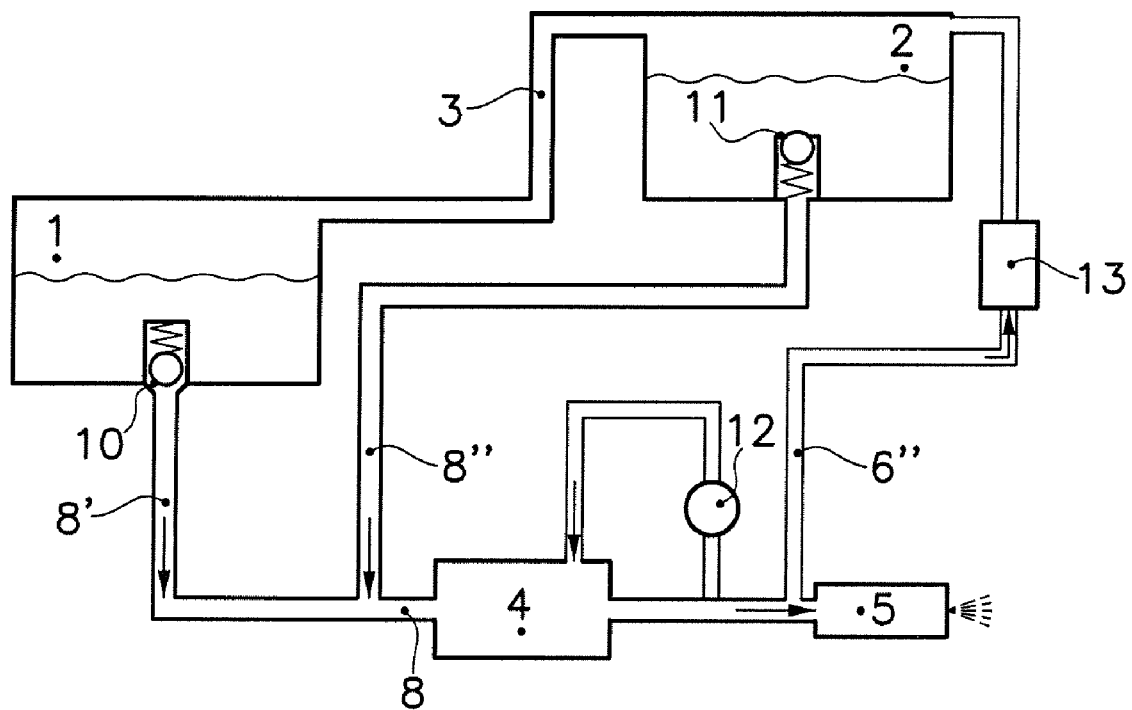
FIG. 2 is a schematic diagram illustrating a system according to an embodiment of the present application.

The present invention is illustrated, non-limitingly, by FIGS. 1 and 2.

The latter represent two variants of systems according to the invention intended for injecting a urea solution into the exhaust gases of a diesel vehicle. In these figures identical numbers designate identical or similar components.

The system from FIG. 1 comprises two tanks (1, 2) filled with urea via a fill opening in tank (2) sealed by a cap (2') and via an overflow line (3) which enables tank (1) to be filled (via overflowing) when tank (2) is full. Tank (2) is equipped with a heating device (H) but tank (1) is not.

It also comprises a pump (4) and an injector (5) which is of the active type (meters the amount of urea) and recirculates the amount of unconsumed solution normally to tank (1) via a return line (6) equipped with a non-return valve (7) (preventing the direct transfer of solution from the tank to the injector). When tank (1) is frozen, the recirculation takes place via the line (6') equipped with a valve (7') that is normally closed but is calibrated so as to open when the line (6) is blocked.

Tanks (1) and (2) are connected to the pump (4) by a common supply line section (8) equipped with a heating device (not shown) and by two branches (8', 8") connected to the section (8) by a "T"-shaped connection. These branches are equipped with non-return valves (10, 11) calibrated in such a way that:

valve (10) is open as soon as there is urea in tank (1) (and this due to a spring-loaded float) and closed in the opposite case; and valve (11) is normally closed and only opens when the pump is running and when valve (10) is closed or the branch (8') is blocked.

The system illustrated also comprises a three-way valve (12) placed in the branch (8') and connected to the downstream side of the pump (4).

Once the tanks (1, 2) are full and the pump (4) is running, the system functions as follows:

Under normal conditions (when it is not freezing), the pump (4) will suck up the urea solution in tank (1) via branch (8'), "T" (9) and section (8) and will supply this solution to the injector (5), which will inject the required amount of solution into the exhaust gases, and recirculate the unconsumed amount to tank (1), via line (6). As soon as tank (1) is empty, valve (10) closes and valve (11) then opens, allowing the pump (4) to suck up the urea solution in tank (2) via branch (8"), "T" (9) and section (8) to supply this solution to the injector (5).

In case of freezing, the heating device of tank (2) switches on and if/when tank (1) and/or branch (8') are frozen, valve (11) will open and the pump (4) will suck up the solution in the tank (2). As for the injector (5), it cannot recirculate the unconsumed solution to tank (1) as the latter is frozen, but since valve (7') has then opened line (6') (as line (6) is then blocked), it can recirculate it to the "T" (9). The fact that the overflow line (3) from tank (2) can also be frozen is not a problem as this line taps into the "T"(9) and does not lead directly into tank (2).

In case of prolonged freezing, when all the solution present in tank (2) is consumed but there is some left in tank (1), a control unit (not illustrated) makes the three-way valve (12) swing into the position illustrated and makes the pump (4) rotate in the opposite direction so as to fill tank (2) with solution from the tank according to the arrows shown. Outside this situation, the three-way valve (12) is rotated 90° with respect to the position illustrated so as to clear (open) the branch (8').

The system shown in FIG. 2 also comprises two tanks (1, 2), but in this system tank (2) is supplied with liquid originating from tank (1) as soon as the system is started with liquid in tank (1). In this system, the pump (4) intentionally discharges an excess flow of liquid so that tank (2), which is heated, is supplied with liquid originating from tank (1) by a bypass line (6"). The latter is equipped with a pressure regulator (13) and the pump (4) is also equipped with a device (12) that makes it possible to provide a sufficient flow rate and pressure at its outlet to be able to provide, under any circumstances, a sufficient flow rate and pressure to the injector (5).

The invention claimed is:

1. A system for storing an additive and injecting it into the exhaust gases of an engine, comprising:

two tanks for storing the additive and one pump for supplying the additive from these tanks in parallel to an injection line, these two tanks each being connected to the pump by a branch of the supply line, each of these branches being equipped with a non-return valve and these two valves being calibrated so that the non-return valve located in the branch coming from the first tank is normally open but closes when the first tank is empty, and so that the non-return valve located in the branch coming from the second tank is normally closed but opens when the non-return valve from the first tank is closed or when the branch coming from the first tank is blocked, wherein the two branches of the supply line open into a common section connecting them to the pump and being equipped with a heating device, and wherein a junction between the branches and the common section is made by a "T"-shaped connection located completely inside the second tank.

2. The system according to claim 1, wherein the additive is an aqueous urea solution.

3. The system according to claim 1, wherein the second tank is equipped with a heating device.

4. The system according to claim 1, wherein the second tank is at a higher level than that of the first tank; wherein the second tank comprises an opening or a fill pipe and also an overflow line that opens into the first tank and is of suitable location and geometry so that the first tank is able to be filled by overflowing from the second tank.

5. The system according to claim 1, wherein the non-return valve located in the branch from the first tank is a valve comprising a spring-loaded float.

6. The system according to claim 1, wherein the two branches of the supply line open into a common section connecting them to the pump and being equipped with a heating device.

7. The system according to claim 1, wherein an excess additive flow provided by the pump and not injected into the exhaust gases is injected into the "T" connection by a first return line.

8. The system according to claim 7, comprising a second return line, the first return line being used by default and going towards the first tank or towards its branch, the second return line being used in case of obstruction of the first return line, the second return line going towards the "T" connection and being equipped with a valve that is normally closed but that opens when the first return line is blocked.

9. The system according to claim 8, wherein the first return line, or both return lines have at least one part that is cooled by conduction.

10. The system according to claim 9, wherein the supply branch coming from the first tank comprises a three-way valve connected to the downstream side of the pump and wherein the pump is capable of rotating in the opposite direction.

* * * * *